United States Patent [19]  
Ward

[11] 4,062,809  
[45] Dec. 13, 1977

[54] CATALYST FOR PRODUCTION OF MIDDLE DISTILLATE OILS

[75] Inventor: John W. Ward, Yorba Linda, Calif.

[73] Assignee: Union Oil Company of California, Los Angeles, Calif.

[21] Appl. No.: 668,039

[22] Filed: Mar. 18, 1976

[51] Int. Cl.$^2$ .............................................. B01J 29/06
[52] U.S. Cl. ................................................ 252/455 R
[58] Field of Search ........................... 252/455 R, 453

[56] References Cited

U.S. PATENT DOCUMENTS

| 3,242,100 | 3/1966 | Harnsberger et al. | 252/453 X |
| 3,260,681 | 7/1966 | Sanford et al. | 252/455 R |
| 3,451,947 | 6/1969 | Michael | 252/453 |
| 3,705,861 | 12/1972 | Oguchi et al. | 252/453 X |
| 3,931,048 | 1/1976 | Hilfman | 252/455 R |

*Primary Examiner*—Carl F. Dees  
*Attorney, Agent, or Firm*—Lannas S. Henderson; Richard C. Hartman; Dean Sandford

[57] ABSTRACT

Heavy mineral oil fractions are selectively hydrocracked to produce mainly middle distillate oils boiling in the 300°–700° F range. Certain novel, highly active and selective catalysts are utilized comprising molybdenum and/or tungsten plus nickel and/or cobalt supported upon certain heterogeneous composites of a silica-alumina cogel or copolymer dispersed in a matrix consisting essentially of alumina gel.

5 Claims, 1 Drawing Figure

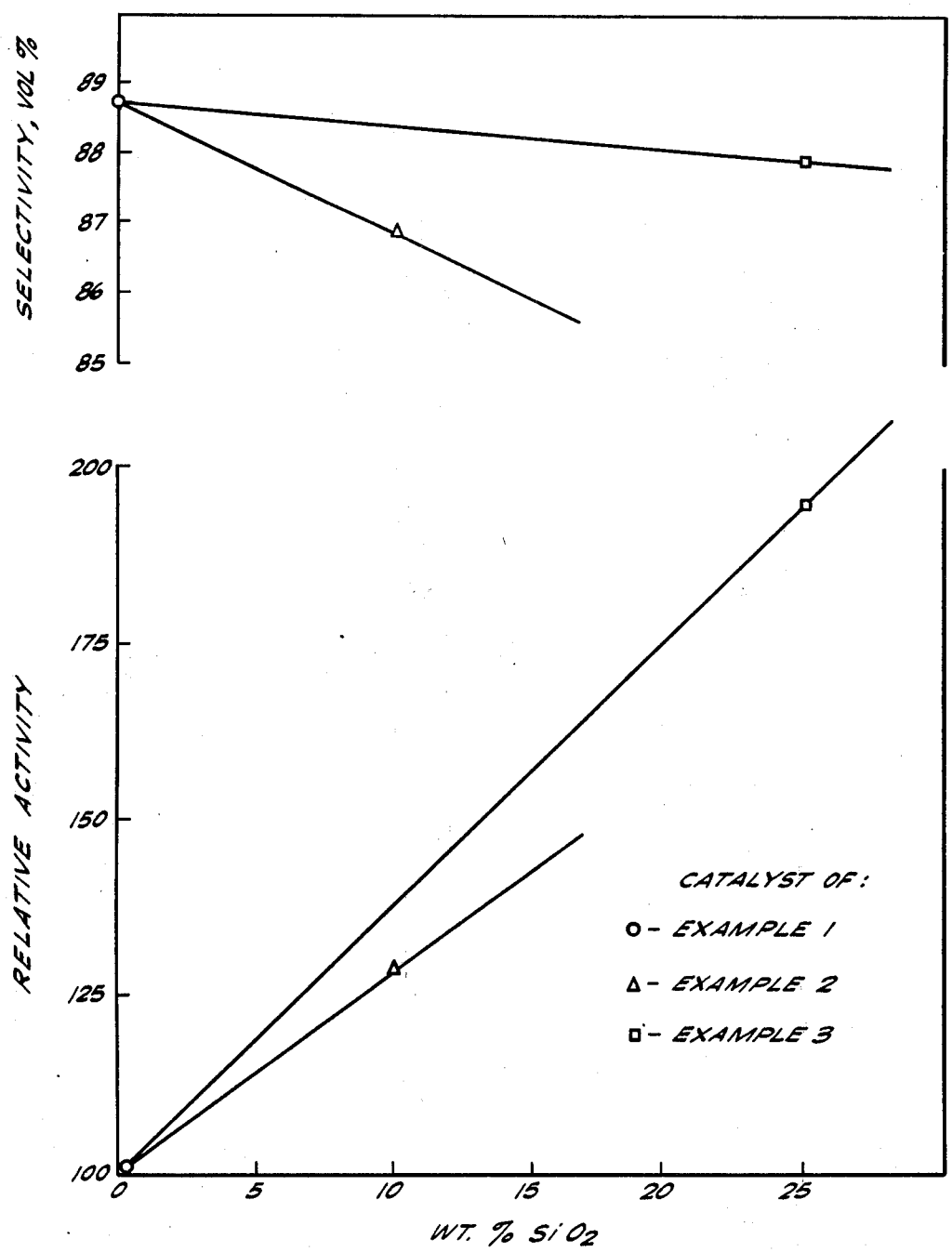

CATALYST FOR PRODUCTION OF MIDDLE DISTILLATE OILS

BACKGROUND AND SUMMARY OF INVENTION

There is today in the petroleum industry a steadily increasing demand for high quality middle distillate products boiling in the range of about 300°-700° F. Such products include for example aviation turbine fuels, diesel fuels, heating oils, solvents and the like. To satisfy the demand for these products, it has recently become desirable to supplement the older refinery procedures of distillation and catalytic cracking with catalytic hydrocracking.

The industrial development of catalytic hydrocracking over the past 15-20 years has been aimed primarily at the production of lower boiling products such as gasoline, and highly active catalysts have been developed for that purpose. These catalysts usually comprise a highly acidic cracking base such as a hydrogen Y zeolite or silica-alumina cogel, upon which is deposited a suitable hydrogenation metal component. In attempting to utilize these catalysts for the conversion of heavy oils boiling above about 700° F to middle distillate products, it was found that selectivity was a major problem. Under hydrocracking conditions sufficiently severe to give economical conversions per pass, a large proportion of the feed was converted to products boiling below about 400° F. Improved yields of middle distillate products could be achieved by operating at lower temperatures, but this entailed the uneconomical alternatives of operating at very low space velocities and/or low conversions per pass. It became apparent that some modification of the strength of the acidic cracking sites would be needed.

Since conventional hydrofining catalysts such as cobalt molybdate supported on alumina were known to display some moderate cracking activity, attempts were made to utilize such catalysts under hydrocracking conditions to obtain a more selective conversion of heavy feeds to middle distillate products. Improved selectivity was obtained, but only by resorting to the uneconomical alternatives of operating at very low space velocities and/or at high temperatures entailing short run lengths. The cracking activity of such catalysts was insufficient to provide a commercially feasible process in situations where maximum middle distillate yields were required.

Various attempts were made to increase the cracking activity of such hydrofining catalysts without sacrificing selectivity. One such attempt is described in my U.S. Pat. No. 3,853,742, in which minor proportions of certain zeolite cracking bases were incorporated into the catalyst. Improved activity was obtained, but at considerable sacrifice of selectivity. Another such attempt is described in U.S. Pat. No. 3,306,843, wherein various proportions of silica gel ranging between about 5 and 70% were incorporated into the catalyst in order to improve cracking activity. Here again, improved activity was obtained only at the expense of drastic losses in selectivity, as indicated by the following data from Example VI of said patent:

| Hydrocracking Heavy Gas Oil | | | | |
|---|---|---|---|---|
| [Charge: Kuwait Vacuum Gas Oil (20.7° API, 3.2% S, 970 p.p.m. N). Conditions: 800° F., 2,000 p.s.i.g., 1.0 LSHV, and 10,000 s.c.f. H$_2$/bbl. Catalyst: 6% Ni, 19% W, 2% F.] | | | | |
| Percentage of Total (SiO$_2$ + Al$_2$O$_3$): | | | | |
| Percent SiO$_2$ | 5 | 10 | 30 | 70 |
| Percent Al$_2$O$_3$ | 95 | 90 | 70 | 30 |
| Activity, percent by vol. off at ° F. ASTM: | | | | |
| 400 | 16 | 23 | 45 | 83 |
| 675 | 67 | 81 | 92 | 100 (+) |
| Selectivity: $\frac{400° - 675° \text{ F. Yield}}{C_5\text{-}400° \text{ F. Yield}}$ | 2.82 | 1.58 | 0.91 | (1) |

(1) Unavailable. Estimated to be approximately 0.20.

At this stage in the development of the art, it appeared that activity and selectivity of hydrocracking catalysts were inherently inversely related to each other; the one could be maximized only by substantially sacrificing the other. The present invention is based upon my discovery of a mode in which silica gel can be incorporated into conventional alumina-based hydrofining catalysts to achieve a substantial increase in overall activity, but with substantially no decrease in selectivity. Insofar as I am aware, in the prior art silica was always incorporated into the catalysts a a homogeneous cogel with the alumina base. According to my invention, silica is heterogeneously dispersed in the alumina base, in the form of a silica-rich, silica-alumina cogel or graft copolymer. The alumina base thus provides a "matrix" in which the finely divided silica-alumina composite is dispersed. In this form, the dispersed silica-alumina provides the desired increase in cracking activity, but apparently some moderating effect of the alumina matrix in close association therewith preserves the original selectivity. The final catalysts, containing a minor proportion of active metal component comprising molybdenum and/or tungsten plus nickel and/or cobalt, not only display a desired increase in activity with no significant loss in selectivity, but are very effective for the hydrodecomposition of organic sulfer and nitrogen compounds in the feed.

BRIEF DESCRIPTION OF DRAWING

The attached drawing comprises a series of graphs depicting the data from Examples 1, 2 and 3 herein.

DETAILED DESCRIPTION

The unique, heterogeneous alumina-silica catalyst supports utilized herein are composed of an alumina gel matrix (preferably a large pore alumina), in which a finely divided, intimately composited silica-alumina component is dispersed. Typically, these supports are prepared by comulling an alumina hydrogel with a homogeneous silica-alumina cogel in hydrous or dry form, or with a "graft copolymer" of silica and alumina, then extruding the homogenized mixture to provide extrudates of about 1/32-⅛ inch in diameter. Alternatively, to provide a more highly porous structure, the homogenized mixture may first be spray dried, then remulled with added water and extruded. Silica-alumina cogel components are prepared by conventional coprecipitation methods, e.g., as described in U.S. Pat. No. 3,210,294. Silica-alumina graft copolymers are prepared in known manner by impregnating silica hydrogel with an aluminum salt followed by precipitation of alumina gel with ammonium hydroxide in the pores of the silica hydrogel. The composition and principal physical characteristics of the dried and calcined supports fall within the approximate ranges:

Table 1

|  | Broad Range | Preferred Range |
|---|---|---|
| Wt.% Cogel or Copolymer | 5 - 75 | 10 - 50 |
| Wt.% SiO$_2$ in Cogel or Copolymer | 20 - 96 | 50 - 90 |
| Overall SiO$_2$ Content of Support, Wt.% | 1 - 72 | 5 - 45 |
| Pore Volume, ml/g | 0.5 - 2.0 | 0.8 - 2.0 |
| Surface Area, m$^2$/g | 150 - 700 | 300 - 600 |
| Av. Pore Diameter, A | 50 - 150 | 70 - 130 |
| Percent of Pore Volume in Pores of Diameter Greater Than: | | |
| 100 A | 10 - 80 | 25 - 70 |
| 500 A | 5 - 60 | 20 - 50 |

While specific supports falling within the above composition ranges give catalysts differing considerably in activity, they share the common characteristics of contributing a higher activity at a given selectivity than would be obtained by using a homogeneous cogel of the same overall SiO$_2$Al$_2$O$_3$ ratio. In general, preferred supports will contain larger proportions of the silica-lean cogels or copolymers, and smaller proportions of the silica-rich composites. A surprising aspect of the heterogeneous supports (in which the silica is intimately composited with only a portion of the total alumina content) is that the alumina matrix appears to moderate the cracking activity of the dispersed silica-alumina component.

In order to provide suitable hydrogenation, desulfurization, and denitrogenation activity, the heterogeneous support is composited with a minor proportion of a nickel and/or cobalt component. Suitable proportions of molybdenum and/or tungsten range between about 5% and 35%, preferably 10-30%, by weight, calculated as the respective trioxides. Suitable proportions of the nickel and/or cobalt component range between about 2% and 15%, preferably 3-10% by weight, calculated as the respective monoxides. The combination of tungsten and nickel is preferred, having been found to give higher activity at a given level of selectivity than does the molybdenum-nickel combination.

The active metals may be added to the support by any of the well known conventional methods providing a homogeneous and intimate dispersion thereof in the support. One or both of the active metal components may be incorporated into the wet support mixture during the mulling stage prior to extrusion. Preferably however, the metals are added by impregnation with aqueous salt solutions thereof after drying and calcining of the support particles. Impregnation may be accomplished using a single mixed impregnation solution, or the metals may be added singly in sequential impregnations with intervening drying and/or calcining. Preferred nickel and cobalt compounds for impregnation of comulling comprise the nitrates, acetates, formates, oxides, carbonates and the like, and preferred tungsten compounds comprise tungstic oxide, ammonium paratungstate and ammonium metatungstate. Molybdenum may be added in the form of molybdenum oxide, ammonium molybdate, ammonium dimolybdate, or ammonium heptamolybdate. Following impregnation, the catalyst is dried and calcined in conventional manner at temperatures of, e.g., 800°-1200° F. The catalyst is preferably sulfided prior to use, using for example mixtures of hydrogen and H$_2$S.

The feedstocks utilized herein boil mostly above about 700° F. At least about 90% of the feed will generally boil between about 650° and 1200° F, with API gravities ranging between about 15° and 30°. Feedstocks having these characteristics include heavy gas oils, vacuum gas oils, deasphalted residua, catalytic cracking cycle stocks, and the like. The feed will generally contain about 0.5-5 wt.% of sulfur and between 10 ppm and 0.1 wt.% nitrogen in the form of organic compounds. It may also contain substantial amounts of polynuclear aromatic compounds, corresponding to about 5-40 volume percent.

Hydrocracking process conditions contemplated herein fall within conventional ranges, and may be summarized as follows:

| | Hydrocracking Conditions | |
|---|---|---|
| | Broad Range | Preferred Range |
| Temp., ° F | 500 - 850 | 600 - 800 |
| Pressure, psig | 750 - 3500 | 1000 - 3000 |
| LHSV | 0.3 - 5 | 0.5 - 3 |
| H$_2$/Oil, MSCF/B | 1 - 10 | 2 - 8 |

Those skilled in the art will understand that the above conditions, principally temperature and space velocity, should be correlated to obtain an economical combination of high conversions per pass to material boiling below the initial boiling point of the feed, and good selectivity of conversion to the desired middle distillate product. The optimum combination of these two variables will of course depend upon a great many factors, including feed properties, specific activity and selectivity of the particular catalyst, and the desired product distribution. Operations conducted at space velocities below about 0.5 are generally uneconomical but are generally necessary when using prior art catalysts in order to obtain desired conversion levels and selectivities. In using the present catalysts, however, commercially feasible operations can be carried out as space velocities above 0.5, and generally above 1.0, while still achieving conversions per pass above 50 volume percent, and usually above 60 volume percent, of 700° F+ feed to 700° F end point liquid product, at a selectivity above 75 volume percent, and generally above 80 volume percent. "Selectivity" as employed herein refers to the volume percent of liquid conversion products (C$_4$+)accounted for by products boiling from about 300° F to the initial boiling point of the feed, which is usually between about 650°-700° F.

The following Examples are cited to illustrate the invention but are not to be construed as limiting in scope:

EXAMPLE I

A prior art type hydrofining catalyst was prepared by impregnating approximately 1/16 inch diameter gamma alumina extrudates with a solution of nickel nitrate and ammonium metatungstate. After drying and calcining, the catalyst contained 2.6 wt.% NiO and 15.4 wt.% WO$_3$. This catalyst was then activity tested, using as the feed a Kuwait vacuum gas oil having the following properties:

| Feed Properties | |
|---|---|
| Gravity, ° API | 22.5 |
| Boiling Range, D-1160, ° F | |
| IBP/5% | 677/741 |
| 50/60 | 843/873 |
| 90/95 | 975/1008 |
| EP/% Rec | 1034/99.0 |

| Feed Properties | |
|---|---|
| Sulfur, wt.% | 3.01 |
| Nitrogen, wt.% | 0.083 |

The test conditions were: 1.0 LHSV, 2000 psig, with a once-through hydrogen flow of 10,000 scf/b. The temperature was adjusted to give a product gravity corresponding to 70 volume percent conversion per pass to 700° F end point product. The temperature required to obtain this conversion was 812° F, and the selectivity of conversion to 300°–700° F product was 88.7 volume percent.

EXAMPLE 2

Another prior art catalyst was prepared by impregnating a 10% $SiO_2$—90% $Al_2O_3$ homogeneous cogel support with a solution of nickel nitrate and ammonium metatungstate. The alumina-silica base had been coprecipitated by adding sodium silicate to aluminum chloride solution and neutralizing with ammonia. After calcining the catalyst contained 3.8 wt.% NiO and 22.7 wt.% $WO_3$. Upon testing this catalyst as described in Example 1, the temperature required for 70 volume percent conversion was found to be 805° F and the selectivity to middle distillate product was 86.9 volume percent.

EXAMPLE 3

A heterogeneous catalyst of the present invention was prepared as follows:

A support containing overall 75 wt.% alumina and 25% silica was prepared by mulling about 33 parts by dry weight of an approximately 75/25 silica-alumina graft copolymer ($Al_2O_3$ precipitated via aluminum sulfate into the pores of a preformed silica gel) with 67 parts by weight of hydrous alumina gel, followed by spray drying. The spray dried composite was then remulled with water and extruded as in Example 1. After calcination at 1200° F, the base was impregnated with a solution of nickel nitrate and ammonium metatungstate. After drying and calcining at 900° F in flowing air, the catalyst contained 4.1 wt.% NiO and 25.7 wt.% $WO_3$. Upon activity testing as in Example 1, the temperature required for 70 percent conversion was found to be 788° F, and the selectivity of conversion to middle distillate was 88 volume percent.

For convenience, the results of the foregoing Examples are tabulated as follows:

Table 2

| Catalyst | Temp. for 70% Conversion, ° F | Relative Activity | Selectivity at 70% Conv., Vol. % |
|---|---|---|---|
| Ex. 1 | 812 | 100 | 88.7 |
| Ex. 2 | 805 | 128 | 86.9 |
| Ex. 3 | 788 | 196 | 88.0 |

The above relative activity figures are calculated from kinetic data indicating that for the reaction system here involved, each 25° F of temperature advantage corresponds to approximately doubling the catalyst activity. These activity figures are plotted versus the respective selectivities in the accompanying drawing.

The foregoing examples illustrate a once-through operation, with no recycle of unconverted oil. The following example will show that even higher selectivity is obtained in a recycle operation.

EXAMPLE 4

The same feedstock utilized in the foregoing examples was subjected to hydrocracking at 2300 psig, 1 LHSV and 10,000 SCF/B of $H_2$, with temperature adjusted to maintain 70 volume percent conversion per pass to 680° F end point liquid product. The unconverted oil was continuously recycled. The catalyst was prepared as described in Example 3, and contained, prior to sulfiding, 3.6 wt.% NiO and 23.8% $WO_3$. After 20 days on-stream the average bed temperature was 791° F, the selectivity of conversion was 94.6%, and the catalyst was deactivating at a rate of only about 0.16° F per day. The 300–680° F diesel fraction of product oil contained 0.6 ppm nitrogen and 10 ppm sulfur. Thus, the catalysts of this invention are not only highly active and selective, but can maintain their activity for extended run lengths of at least about 6 months, and usually at least about 1 year.

The following claims and their obvious equivalents are intended to define the true scope of the invention:

I claim:

1. A hydrocracking catalyst composition comprising a molybdenum and/or tungsten first component plus a nickel and/or cobalt second component supported on a heterogeneous support comprising 10–50 weight-percent of a cracking component consisting essentially of a finely divided silica-alumina cogel or copolymer containing about 50–90 weight-percent of $SiO_2$, said cracking component being dispersed in a matrix consisting essentially of alumina.

2. A catalyst as defined in claim 1 wherein said first component is tungsten, or an oxide or sulfide thereof, and said second component is nickel or an oxide or sulfide thereof.

3. A catalyst as defined in claim 1 wherein said heterogeneous support has a pore volume of about 0.8–2.0 ml/g.

4. A catalyst as defined in claim 3 wherein about 25–70% of said pore volume is in pores of greater than 100 A diameter.

5. A catalyst as defined in claim 4 wherein about 20–50% of said pore volume is in pores of greater than 500 A.

* * * * *